(12) United States Patent
Hirose

(10) Patent No.: US 7,615,703 B2
(45) Date of Patent: Nov. 10, 2009

(54) ELECTROLYTE COMPOSITION, DYE-SENSITIZED SOLAR CELL AND PRODUCTION METHOD THEREOF

(75) Inventor: Masashi Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 11/066,215

(22) Filed: Feb. 28, 2005

(65) Prior Publication Data

US 2005/0194040 A1  Sep. 8, 2005

(30) Foreign Application Priority Data

Mar. 3, 2004 (JP) .............................. 2004-058673

(51) Int. Cl.
*H01L 25/00* (2006.01)
*H01L 31/00* (2006.01)

(52) U.S. Cl. ...................................................... 136/243

(58) Field of Classification Search .......... 136/243–265
See application file for complete search history.

(56) References Cited

U.S. PATENT DOCUMENTS

| 4,202,870 | A | | 5/1980 | Weber et al. ................ 423/630 |
| 4,242,271 | A | | 12/1980 | Weber et al. ................ 260/448 |
| 4,248,852 | A | | 2/1981 | Wakabayashi et al. ...... 423/626 |
| 4,927,721 | A | | 5/1990 | Gratzel et al. ............... 429/111 |
| 5,102,750 | A | * | 4/1992 | Taylor .......................... 429/30 |
| 5,202,196 | A | * | 4/1993 | Wang et al. ................... 429/86 |
| 6,301,039 | B1 | * | 10/2001 | Tench .......................... 359/267 |
| 6,350,946 | B1 | * | 2/2002 | Miyake et al. ............... 136/252 |

FOREIGN PATENT DOCUMENTS

| JP | 57-44605 | 9/1982 |
| JP | 1-220380 | 9/1989 |
| JP | 2002-100416 | 4/2002 |
| JP | 2003-226766 | 8/2003 |

OTHER PUBLICATIONS

Wataru Kubo, et al., "Quasi-solid-state dye-sensitized solar cells using room temperature molten salts and a low molecular weight gelator", Chemical Communications, No. 4, Feb. 2002, pp. 374-375.
Wataru Kubo, et al., "Quasi-Solid-State Dye-Sensitized Solar Cell with Ionic Polymer Electrolyte", Chemistry Letters, 2002, pp. 948-949.

(Continued)

*Primary Examiner*—Alexa D Neckel
*Assistant Examiner*—Miriam Berdichevsky
(74) *Attorney, Agent, or Firm*—Fitzpatrick, Cella, Harper & Scinto

(57) ABSTRACT

An electrolyte composition is provided which is for use in a dye-sensitized solar cell that carries a dye on a semiconductor and converts light energy to electric energy by photoexcitation of the dye, and which comprises aluminum oxide and water, and has a paste-like form. By using the electrolyte composition for a dye-sensitized solar cell, the concern for liquid leakage can be eliminated, the operation cost and material cost can be reduced through simplification of an encapsulating step and increase in degree of freedom in selection of an encapsulating material, and besides the basic photoelectric conversion characteristics can be improved.

6 Claims, 1 Drawing Sheet

OTHER PUBLICATIONS

Satoshi Mikoshiba, et al., "Anomalous Increase in Photocurrent Density for Quasi-solid Dye Sensitized Solar Cells by Addition of Tetra(bromomethyl)benzene", Chemistry Letters, 2002, pp. 918-919.

D. M. de Leeuw, et al., "Electroplating of conductive polymers for the metallization of insulators", Synthetic Metals, vol. 66, No. 3, Oct. 1994, pp. 263-273.

E. Olsen, et al., "Dissolution of platinum in methoxy propionitrile containing LiI/I2", Solar Energy Materials & Solar Cells, vol. 63, pp. 267-273 (2000).

Zakeerudin, S.M. et al., "Design, Synthesis, and Application of Amphiphilic Ruthenium Polypyridyl Photosensitizers in Solar Cells Based on Nanocrystalline TiO2 Films", Langmuir, 18, pp. 952-954 (2002).

* cited by examiner

FIGURE
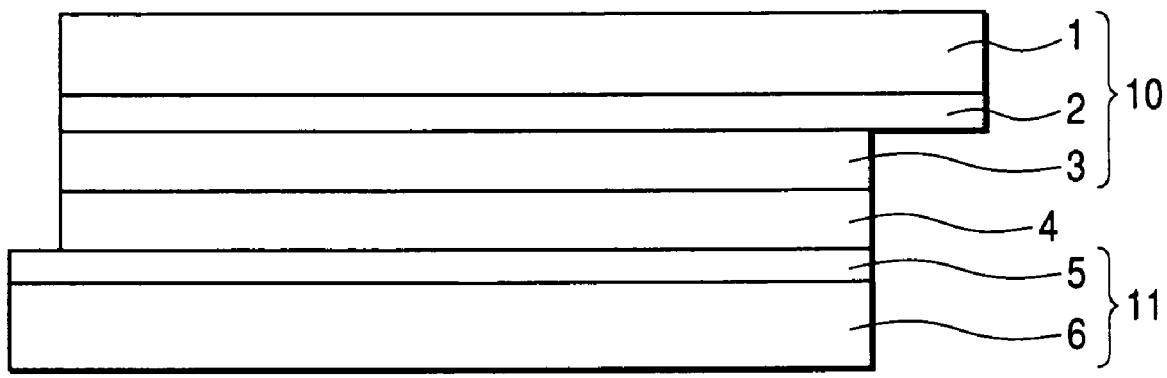

ELECTROLYTE COMPOSITION, DYE-SENSITIZED SOLAR CELL AND PRODUCTION METHOD THEREOF

BACKGROUND OF THE INVENTION

1. Field of the Invention

The present invention relates to an electrolyte composition used in a dye-sensitized solar cell, a dye-sensitized solar cell and a production method thereof.

2. Related Background Art

A photoelectric conversion element using a semiconductor such as silicon converts a ray of light such as sunlight and a laser beam into electric energy, and a solar cell utilizing the photoelectric conversion element receives attention as a petroleum-replacement energy source and as an energy source that emits no $CO_2$. There are used many types of photoelectric conversion elements in the solar cell, such as a monocrystalline silicon type, an amorphous silicon type, a polycrystalline silicon type and other compound types, but these have the following problems. Specifically, the photoelectric conversion element of the monocrystalline silicon type is produced in the same process as in the semiconductor production, which needs an expensive cost, though the element provides a high conversion efficiency. Further, because of its low coefficient of light absorption, it is required to have a thickness of some extent (preferably 50 μm or more), which increases the quantity of expensive high-purity silicon to be used, and consequently increases the material cost. On the other hand, the polycrystalline silicon type may be produced at a lower production cost, but cannot reduce the thickness of the expensive silicon material for the solar cell, and still needs a high material cost. Under these circumstances, there have been research works for developing an amorphous silicon solar cell that can be produced to have a large area at a low cost. However, this solar cell still employs the same raw material, and it is hard to say that it has an adequate cost-cutting effect.

On the other hand, a certain device attracts attention as one form of a photoelectric conversion device, which differs from a conventional solar cell, does not employ Si as a raw material, but as described in Japanese Patent Application Laid-Open No. H01-220380, comprises a first transparent electrode, a transparent semiconductor provided thereon, a colorant adsorbed on a surface of the transparent semiconductor and having a sensitizing effect, a charge transportation layer provided thereon, and a second transparent electrode on the charge transportation layer. Such a device does not need an expensive raw material of high-purity Si, but uses inexpensive an oxide semiconductor such as titanium oxide and zinc oxide, to significantly reduce the raw material cost. Further, the device also does not need a production apparatus for use under high vacuum in contrast to that for a Si solar cell, may greatly reduce the cost for a production facility and may become a great step for the spread of solar cells.

The photoelectric conversion device operates in the process described below.

When incident light reaches a colorant having a sensitizing effect through a first transparent electrode and a transparent semiconductor, or the sensitizing colorant through a second transparent electrode and a carrier layer, the light excites the colorant having the sensitizing effect to generate electrons in a LUMO level and holes in a HOMO level. The electrons produced by excitation in the LUMO level of the sensitizing colorant immediately move to the conduction band of the transparent semiconductor and migrate to the first transparent electrode. The holes remaining in the HOMO level of the sensitizing colorant receive electrons from a carrier-transfer layer, whereby the sensitizing colorant is neutralized. Ions or holes produced in the carrier-transfer layer by the impartment of electrons diffuse in the carrier-transfer layer, reach the second clear electrode, and receive electrons from the second transparent electrode. By using the first transparent electrode that has received the electrons as a negative electrode, and the second transparent electrode that have imparted the electrons as a positive electrode, it is possible to obtain an electrical signal or an electric power converted from the incident light pattern.

However, such a photoelectric conversion element employs a liquid electrolyte, which poses the problem of durability thereof.

Main factors responsible for deterioration seen in long-duration use include (1) leak or vaporization of an electrolyte, (2) short circuiting between electrodes, (3) deterioration of dye, (4) peeling off of a porous electrode, and (5) deterioration of a transparent electrode. Of these factors, (1) the leak or vaporization of the electrolyte is the largest issue, and it is very difficult in a production process to seal the liquid on a large area so as to endure a long period of light irradiation.

Recently, research works on an electrolyte using a solvent with a high boiling point such as polyethylene glycol, and an electrolyte using an ionic liquid as a main component, which is a liquid at ordinary temperature and does not vaporize, have been energetically conducted. The electrolytes developed in these research works scarcely vaporize, and such devices as to employ the electrolytes and have consequent superior durability are published. However, as long as the employed electrolyte is liquid, a large amount of an electrolyte liquid can leak from even a fine fracture in a sealed part through capillary phenomenon, so that it is very difficult to maintain a completely sealed state for a long period of time in a system using a flexible substrate, and an encapsulating material has to be prudently selected and the encapsulating step has to be perfect in a significantly high level.

For the purpose of avoiding the difficulty of encapsulating, a research work for using a solid electrolyte has been conducted. There have been conducted a research work for using copper iodide of a P-type semiconductor, and a research work for using an organic hole-transfer layer of an electroconductive (hereinafter, simply referred to as conductive) polymer. However, these solid electrolytes cannot maintain the characteristics for a long period of time or have low conversion efficiency, and sufficient solid electrolytes have not been yet obtained.

The electrolyte regarded as the most hopeful for solving these problems is now a gelation of a liquid electrolyte. There proposed are the research works for using a low-molecular type gelating agent published in Chem. commun. 2002, 374; a method of introducing a reaction precursor into a cell, effecting polymerization to constitute a matrix, and then effecting impregnation with an electrolyte liquid thereto published in chem. lett. 948, 2002; and a method of constituting a network of a micro-layer-separation structure in an electrolyte liquid by using a vinylpyridine polymer and a polyfunctional halide as crosslinking agent to conduct gelation, published in chem, lett. 918 (2002).

In any of the methods, the obtained performance of the gelated electrolytes are equal to or nearly equal to that of a liquid electrolyte, but in order to produce the gelated electrolyte, it is necessary to inject a reaction liquid into an encapsulated cell and promote the gelation by heat or the like, so that the production process is more complicated than that of using a normal liquid electrolyte.

In Japanese Patent Application Laid-Open No. 2003-226766, a method is studied in which a porous film is formed of an HFP-PVDF copolymer and impregnated with an electrolyte liquid to provide a film-shaped electrolyte. The method is considered to be very useful as one of methods for simplifying the handling of an electrolyte. This photoelectric conversion device uses a plastic film having a transparent conductive film of ITO formed thereon as a medium can be continuously produced in a roll-to-roll system, so that the cost is considered to be significantly reduced. However, in order to impart a predetermined pattern to an electrolyte, a step of disposing a formed film-shaped electrolyte at a predetermined location, or a step of imparting the film to the whole area and appropriately removing an unnecessary part is considered to be necessary, and a step, an apparatus and an alignment method therefor are considered to be necessary.

SUMMARY OF THE INVENTION

The present invention has been accomplished in view of the above-described prior art problems, and it is, therefore, an object of the present invention to provide a paste-like (or pasty) electrolyte by which an electrolyte can be applied in the same step as a porous semiconductor production step for applying a paste-like dispersion to a substrate by means of a screen printing method or the like, and which has a performance substantially comparable to that of a liquid electrolyte and can simplify the production steps.

In order to achieve the above-mentioned object, the present inventors have made an extensive study and have consequently found that by adding aluminum oxide fine particles that contain water to an electrolyte liquid, it is possible to make an electrolyte highly transparent and pasty and to apply the electrolyte by a method such as screen printing or the like, and photoelectric conversion characteristics equal to those before the addition can be attained, or photoelectric conversion characteristics superior to those before the addition can be attained depending on the conditions; and have accomplished the present invention.

Specifically, the electrolyte composition in accordance with the present invention is characterized by being for use in a dye-sensitized solar cell that carries a dye on a semiconductor and converts light energy to electric energy by photoexcitation of the dye and comprising aluminum oxide and water, and having a paste-like form.

Further, the dye-sensitized solar cell in accordance with the present invention is characterized by having an electrolyte layer comprising the above-mentioned electrolyte composition.

Moreover, the method of producing a dye-sensitized solar cell in accordance with the present invention is characterized by comprising the steps of applying the above-mentioned electrolyte composition to a semiconductor on an electrode to form an electrolyte layer and providing an opposing electrode on the electrolyte layer.

BRIEF DESCRIPTION OF THE DRAWINGS

The FIGURE is a schematic sectional view showing one example of the dye-sensitized solar cell in accordance with the present invention.

DESCRIPTION OF THE PREFERRED EMBODIMENTS

The present invention will be described in detail below.

The FIGURE is a schematic sectional view showing an example of the dye-sensitized solar cell in accordance with the present invention. A dye-sensitized solar cell shown in the FIGURE consists of a semiconductor electrode substrate 10, an opposing substrate 11, and an electrolyte layer 4 interposed between the both substrates. The semiconductor electrode substrate 10 consists of a substrate 1 and a conductive layer 2 formed thereon, which form a conductive substrate, and a semiconductor electrode 3 carrying a dye further formed thereon. The opposing substrate 11 consists of a substrate 6 and an opposing electrode 5 formed thereon. Here, the conductive layer 2 and the opposing electrode 5 are not necessarily required to be provided if the substrates 1 and 6 have electroconductivity. From the viewpoint of photoelectric conversion efficiency, either the conductive substrate or the opposing substrate 11 is preferably transparent, but the both may be transparent depending on the use.

<Electrolyte Layer 4>

The electrolyte layer is made of a paste-like electrolyte composition containing aluminum oxide and water. The electrolyte composition in accordance with the present invention can be obtained, for instance, by adding a paste prepared by dispersing aluminum oxide (alumina) in water, to an electrolyte liquid, and mixing them to process the whole electrolyte into a paste-like form.

The content of aluminum oxide is preferably 1 to 20 wt %, and more preferably 5 to 15 wt %. If the aluminum oxide is less than 1 wt %, the composition may hardly become pasty, and if the aluminum oxide is more than 20 wt %, the conversion efficiency may be lowered because the relative amount of the electrolyte is reduced. Further, the content of water is preferably 5 to 30 wt %, and more preferably 10 to 20 wt %. Water in an amount of less than 5 wt % may make the paste ununiform and unapplicable, and water exceeding 20 wt % may cause phenomena of flowout of the electrolyte or lowering in the conversion efficiency.

Incidentally, in the claims and specification of the present application, in order to discriminate the state of reduced flowability in accordance with the present invention from "gelation" which means the state in which the flowability has disappeared by filling a liquid in a cell formed by combining a semiconductor electrode with an opposing electrode and then applying light or heat thereto, the state in which the flowability has been reduced by the addition of aluminum oxide will be hereinafter referred to as "paste-like" or "pasty", and such an electrolyte composition will be referred to as "paste-like electrolyte composition" or "pasty electrolyte composition". In addition, the term "aluminum oxide" employed herein is intended to encompass hydrated alumina and alumina hydroxide.

As the aluminum oxide, there may be used the one produced by calcinating aluminum hydroxide obtained by the so called Bayer process which treats bauxite as a natural mineral with hot caustic soda; the one produced by calcinating aluminum hydroxide obtained by spark-discharge of metallic aluminum pellets in water; and the one produced by decomposing an inorganic aluminum salt (alum, etc.).

The crystal structure of aluminum oxide is known to change, depending on the temperature of heat treatment, from aluminum hydroxides of a gibbsite form or a boehmite form, to aluminum oxides of $\gamma$, $\sigma$, $\eta$, $\theta$ and $\alpha$ forms. As a matter of course, in the present invention, any of the above described crystal structures can be used. Among them, from the viewpoint of ink absorbability and the transparency of a formed electrolyte layer, the aluminum oxide of γ-type crystal is preferable.

Further, as the aluminum oxide, hydrated alumina expressed by the composition formula:

$$Al_2O_{3-n}(OH)_{2n} \cdot mH_2O$$

(wherein, n is any one of integers of 1, 2 and 3, and m is a value of 0 to 10 and preferably 0 to 5) can be used.

Because mH$_2$O also expresses detachable water that is not involved in the formation of a crystal lattice in many cases, m can be either an integer value or a non-integer value. In addition, when this kind of material is heated, m may reach 0.

Hydrated alumina can generally be produced by such a well-known method as the method of hydrolyzing aluminum alkoxide or sodium aluminate, which is described in U.S. Pat. Nos. 4,242,271 and 4,202,870, and the method of adding an aqueous solution of aluminum sulfate or aluminum chloride to an aqueous solution of sodium aluminate to effect neutralization, which is described in Japanese Patent Publication No. 57-44605. Hydrated alumina can be selected from the substances produced by the above-described methods or is commercially available under a trade name such as Disperal (manufactured by SASOL).

It is preferred that the aluminum oxide has an average particle diameter of 1 μm or less, and preferably not less than 50 nm but less than 500 nm. When the average particle diameter exceeds 1 μm, the transparency of the electrolyte composition tends to lower. In addition, the aluminum oxide preferably has a BET specific surface area of 100 m$^2$/g or more. When the specific surface area is less than 100 m$^2$/g, white cloudiness of the electrolyte composition may be occurred due to light scattering.

Next, as the electrolyte liquid, there are preferably used those which contain ionic liquid as a major component.

Examples of the material of the ionic liquid include, but not limited to, an imidazolium salt, a pyridinium salt, a pyrazolium salt and a triazolium salt. In addition, those can be singly used, or a mixture of two or more salts can be used. The ionic liquid is preferably in a liquid state at ordinary temperature. Particularly, an imidazolium salt such as 1-methyl-3-ethyl imidazolium salt and 1-methyl-3-propyl imidazolium salt is preferably used. In addition, a counter anion of the ionic liquid is preferably an iodine ion used as a redox couple, but in order to adjust solubility, viscosity and other characteristics, a halide ion such as Cl$^-$ and Br$^-$, NSC$^-$, BF$_4^-$, PF$_6^-$, ClO$_4^-$, (CF$_3$SO$_2$)$_2$N$^-$, (CF$_3$CF$_2$SO$_2$)$_2$N$^-$, CF$_3$SO$_3^-$, CF$_3$COO$^-$, Ph$_4$B$^-$, (CF$_3$SO$_2$)$_3$C$^-$, and F(HF)$_n^-$, or a mixture thereof may be used.

In the electrolyte composition, in addition to or instead of the ionic liquid, there may be used those liquids which contain a less volatilizable solvent, have a high boiling point and have no or extremely low vapor pressure, and it is more preferable to use an organic solvent having a boiling point of 150° C. or more. Further, it is preferable that the contained organic solvent has a vapor pressure of 1 mmHg or less at 20° C., because the volatilization preventing effect is improved. Examples of usable organic solvents are shown below, but are not limited thereto.

TABLE 1

| | Boiling Point [° C.; 760 mmHg] | Vapor Pressure [mmHg; 20° C.] |
|---|---|---|
| glycerol | 290 | <0.0025 |
| ethylene glycol | 197.85 | <0.07 |
| diethylene glycol | 244.8 | <0.01 |
| hexyleneglycol | 197.1 | 0.02 |
| propylene glycol | 187.3 | 0.08 |
| dietheleneglycol dibuthylether | 254.6 | 0.01 |
| dietheleneglycol diethylether | 188.4 | 0.38 |
| dietheleneglycol dimethylether | 159.76 | 3.4 |
| diethyleneglycol monoethyl ether | 202 | 0.13 |
| diethyleneglycol monobuthyl ether | 230.4 | 0.01 |
| triethyleneglycol | 288 | 0.00134 |
| triethyleneglycol monomethyl ether | 249 | <0.01 |
| tetraethylene glycol | 327.3 | <0.001 |

An electrolyte composition containing a larger amount of an organic solvent has a slight tack when formed into a paste, and is very easily handled when used in an application step. Further, the composition easily penetrates into a semiconductor because of having a lower viscosity than that of the ionic liquid, which is one of the reasons why the composition is preferably used.

Besides, the electrolyte composition can contain an organic solvent for the purpose of controlling viscosity. In order to increase the mobility of ions, the viscosity of the organic solvent is preferably low, and in order to increase the effective carrier concentration, the dielectric constant of the organic solvent is preferably high. Examples of the usable organic solvent includes, for instance, a carbonate ester, a lactone, an ether, an alcohol, a glycol, tetrahydrofuran, a nitrile, a carboxylate ester, a phosphotriester, a heterocyclic compound such as N-methylpyrrolidone, 2-methyl-1,3-dioxolane and sulfolane, and an aprotic organic solvent such as dimethylsulfoxide, formamide, N,N-dimethylformamide and nitromethane, or a mixture thereof.

Examples of the usable redox couple of the electrolyte composition preferably includes those containing I$^-$ and I$_3^-$, which are obtained by mixing iodine molecules (I$_2$), for instance, with an iodide of an alkali metal or an iodine salt of an organic cation.

Examples of the usable iodide include, an iodide of an alkali metal or an alkaline earth metal (Li, Na, K, Mg, etc.); a quaternary ammonium compound such as tetraalkylammonium iodine salt, pyridinium iodine salt and imidazolium iodine salt; and an iodide of a heterocyclic nitrogen-containing compound. Specific examples include 1,3-dimethyl imidazolium iodide, 1-methyl-3-ethyl imidazolium iodide, 1-methyl-3-propyl imidazolium iodide, 1-methyl-3-hexyl imidazolium iodide, 1,2-dimethyl-3-propyl imidazole iodide, 1-ethyl-3-isopropyl imidazolium iodide, and pyrrolidinium iodide. One or more selected from these compounds can be used.

Further, the concentration of the electrolyte salt is preferably 0.05 to 5 M with respect to a solvent or ionic liquid, and more preferably 0.2 to 1 M. The concentrations of I$_2$ and Br$_2$ are preferably 0.0005 to 1 M, and more preferably 0.001 to 0.1 M. For the purpose of improving the open-circuit voltage and the short-circuit current, various additives such as 4-tert-butylpyridine or a carboxylic acid can be added.

As the ratio of the electrolyte liquid component in the electrolyte composition increases, the ionic conductivity also increases, but the properties of the paste become close to those of a liquid. Accordingly, the percentage of the electrolyte liquid component in the electrolyte composition is preferably 50 wt % or more, and more preferably 70 to 90 wt %.

<Semiconductor Electrode Substrate 10>

The semiconductor electrode substrate can be formed, for instance, as described below.

First, semiconductor fine particles such as titanium oxide fine particles, additives for film formation such as a dispersing agent and a thickening agent, and a solvent are mixed, and the mixture is dispersed with the use of a dispersing apparatus such as a sand mill to prepare a semiconductor particle dispersion. The solvent and the dispersing agent can be appropriately selected from chemicals suitable for film formation. For instance, a mixture of water and acetylacetone can be preferably used. In addition, the thickening agent is used for the purpose of improving the uniformity of a film by increasing the viscosity of a semiconductor particle dispersion, and suppressing peeling off and cracking of the film during calcination of the semiconductor electrode, and there are preferably used those thickening agents which completely vaporize at a lower temperature than the calcination temperature of the semiconductor electrode. For instance, when the electrode is calcined at 500° C., there are preferably used a cellulosic binder such as hydroxypropylcellulose having a boiling point of 500° C. or less, polyethylene glycol having a molecular weight of about 10,000 to 20,000, or the like. The addition amounts of various additives are preferably 15 to 75 wt % on the basis of the total weight of the semiconductor fine particles in the semiconductor particle dispersion.

Subsequently, the obtained semiconductor fine particle dispersion is applied to a conductive substrate. Examples of the application method include, but not limited to, a method of using a device such as a slit coater, a spin coater, a roll coater and a dip coater; a printing method such as screen printing, flexographic printing and gravure printing; and a comparatively simple method of using a doctor blade, a bar coater or the like. The thickness of a semiconductor electrode formed on the conductive substrate is about 5 to 15 μm, and preferably about 10 μm. The thus applied dispersion is dried so as not to cause cracking or peeling, and is calcined in air at a temperature of about 500° C. to form a porous semiconductor electrode made of a semiconductor fine particulate material.

As the semiconductor fine particles, fine particles of a metallic oxide is preferably used which includes an oxide of an alkaline earth metal such as magnesium, strontium and calcium, an oxide of a transition metal such as titanium, tin, zinc, indium, zirconium, niobium, tantalum, chromium, molybdenum and tungsten, and a mixture of these oxides. The semiconductor fine particles may be formed by oxidizing surfaces of metallic fine particles having a high conductivity.

The diameter of the semiconductor fine particles is preferably small, because such particles increase the surface area of the semiconductor electrode and enhance the photoelectric conversion efficiency. However, in view of the easiness of producing a semiconductor fine particle dispersion, the stability of the dispersion, the easiness of forming a film, and the performance, the average diameter of the semiconductor fine particles is preferably 5 to 100 nm and most preferably 10 to 30 nm.

When calcinating the semiconductor fine particles to form a semiconductor electrode, because the surface state will vary depending on the calcination temperature, attention should be given thereto. It is most preferred that a semiconductor electrode prepared using titanium oxide (anatase) fine particles, which are most generally used, is calcined at about 450° C.

In addition, in order to enable a film substrate to be used, a method of heating the particles at 200° C. or less to form a semiconductor electrode is preferably used. One of the methods includes, as is shown in Japanese Patent Application Laid-Open No. 2002-100416, a method of depositing fine particles to a substrate by electrophoresis. Further, there is a method of applying titanium oxide sol developed for low-temperature calcination such as Ti-Nanoxide D-L (trade name; manufactured by Solaronix Corp.) or SP200 (trade name; manufactured by Showa Denko K.K.), and effect calcination at about 150° C.

In order to further improve the performance of the semiconductor electrode formed as described above, the surface of the semiconductor electrode may be chemically treated with various chemicals, or physically treated with ultraviolet irradiation. For instance, it is known that the conversion efficiency is improved by forming a porous semiconductor electrode of titanium oxide, then applying a titanium tetrachloride aqueous solution dropwise on the electrode, and keeping the electrode for several hours. Such treatment may be carried out.

As the dye to be carried on the semiconductor electrode, there may be used those which have heretofore been known and can stably be dissolved in a solution composition used as a dye-containing liquid. Examples of such dyes include various dyes, for instance, a xanthene dye such as ruthenium polypyridinium complex, chlorophyll, porphyrin, phthalocyanine, triphenylmethane, fluorescein and Rhodamine, and polymethine, squalirium and cumarin. The dye has preferably a functional group having any coupling with the semiconductor electrode, in order to smoothly transfer energy to the semiconductor electrode. It is preferred that the dye has, for instance, a polar group such as carboxyl group, phosphonyl group, amino group and sulfone group for instance, and can form a coordinate bond or an ester-type bond with a metal atom of the semiconductor electrode.

Next, as the method of making the semiconductor electrode carry a dye, there are included a method of immersing a semiconductor electrode substrate in a dye solution having a dye dissolved in a solvent such as alcohol, and effecting refluxing as needed to make the dye absorbed on the surface of the semiconductor electrode, and so on. The concentration of the dye in the dye solution is preferably 0.1 to 1 mM, and more preferably is about 0.3 to 0.5 mM. The immersion time is preferably 12 hours at room temperature, 1 hour at about 40° C., and 30 minutes at about 50° C., but because the degree of dyeing depends on the film formation state of the semiconductor electrode, the temperature and the immersion time need to be appropriately adjusted depending on the type of the semiconductor electrode used and the treatment process adopted.

After the dying has been finished, surplus dye is washed off with ethanol, acetonitrile, or the like and in order to prevent electrons from migrating reversely to the electrolyte composition, the surface may be treated with an organic acid such as acetic acid or a base such as t-butylpyridine.

<Opposing Substrate 11>

The opposing electrode preferably has such a catalytic action as to promote a reduction reaction of an electrolyte layer. Specifically, there are used those having platinum vapor-deposited on a platinum electrode or carbon electrode or those having carbon fine particles adsorbed thereto. As a substitute for expensive platinum, a substrate treated with a conductive polymer may be used. A preferably used substrate of the above type is, as is described in Synthetic Metals 1994, 66, 263, PEDOT doped with iron p-toluene sulfonate.

<Production of Dye-sensitized Solar Cell>

A method of producing a dye-sensitized solar cell comprises applying an appropriate amount of an electrolyte composition to a semiconductor electrode of a semiconductor electrode substrate using a technique such as screen printing, and making the applied surface face an opposing electrode side of an opposing substrate. At this time, the both substrates are brought into close contact with each other by pressure-bonding because the electrolyte composition has adequate viscosity, but for the purpose of keeping a constant spacing between the substrates, they may be bonded with a material such as a two-sided adhesive tape having a constant film thickness. Alternatively, the both substrates can be thermo-compression-bonded by use of a thermoplastic resin film. Further, the both substrates can be bonded or can be together encapsulated by use of a liquid adhesive. In this case, in order to keep a constant spacing between the substrates, a material such as a bead may be added to a bonding adhesive or an electrolyte, as a spacer. Alternatively, they may be bonded after sandwiching a film having a fixed thickness at a portion apart from a light-receiving surface. Alternatively, a spacer composition having a constant height may be fixed or formed on either of the substrates.

Further, a solar cell may be encapsulated so that the electrolyte composition does not flow out thereof. The encapsulating material is not particularly limited, but for instance, an epoxy resin, a silicone resin, a thermoplastic resin made of an ethylene/methacrylic acid copolymer, and glass frit are preferably used. At this time, it is necessary to consider adjusting the amount of the electrolyte composition to be applied, providing an adequate space and the like, so that the adhesion may not be impaired by squeeze-out of the electrolyte composition.

In addition, in order to promote impregnation of the electrolyte liquid into the semiconductor electrode, the encapsulated solar cell may be heated to an extent of causing no problem.

In addition, for the purpose of protecting the whole solar cell, after securing an electric drawing-out line with a lead wire or the like, the whole cell may be laminated with a film or coated with a liquid resin.

The electrolyte composition described in the preferred embodiment above eliminates the concern of liquid leakage, and the simplification of the encapsulating step and the increase in degree of freedom in selection of an encapsulating material can be attained to reduce the operation cost and the material cost. Furthermore, when the electrolyte composition is employed in an electrolyte layer of a dye-sensitized solar cell, the basic photoelectric conversion characteristics are seen to be improved.

EXAMPLES

<Production of Alumina Paste>

A mixture of 20 wt % of hydrated alumina ("Disperal HP18" (trade name) manufactured by SASOL) as a solid content having an average particle diameter of about 0.2 μm, 0.4 wt % of acetic acid, and 79.6 wt % of water was stirred with a planetary-type stirrer ("AR100" (trade name) manufactured by Thinky Corp.) to produce a viscous alumina paste 1.

Furthermore, alumina pastes 2 to 4 were produced following the same procedure as mentioned above with the exception that the compositions were set to those shown in Table 2. Alumina paste 3 had a composition containing a small amount of water, so that it became whitely clouded and formed a lumpy state having large granular blocks. Alumina paste 4 had a composition containing a large amount of water, so that it was almost in liquid state.

TABLE 2

|  | Hydrated Alumina [wt %] | Water [wt %] | Acetic Acid [wt %] | Property |
|---|---|---|---|---|
| Alumina Paste 1 | 20.0 | 79.6 | 0.4 | Viscous liquid |
| Alumina Paste 2 | 40.0 | 59.2 | 0.8 | Paste |
| Alumina Paste 3 | 50.0 | 49.0 | 1.0 | Lumpy state |
| Alumina Paste 4 | 15.0 | 84.7 | 0.3 | Liquid |

Example 1

Alumina paste 1 and an electrolyte liquid 1 (a high-boiling-point solvent liquid electrolyte, which had 0.5 M of lithium iodide and 0.05 M of iodine dissolved in polyethylene glycol of an average molecular weight of 200 as a solvent) were mixed in a ratio shown in Table 3 and were stirred with a planetary-type stirrer ("AR100" (trade name) manufactured by Thinky Corp.) to produce a uniform pasty electrolyte composition.

A dye-sensitized solar cell was produced by use of this electrolyte composition, in the manner described below.

At first, a titanium oxide fine particle dispersion paste ("Ti-Nanoxide D" (trade name) manufactured by Solaronix) was applied with a doctor blade to a glass substrate having a transparent conductive film formed thereon ($SnO_2$:F film-formed glass substrate, having a sheet resistance of 10 Ω/□, manufactured by Nippon Sheet Glass Co., Ltd.) was dried at room temperature, and then calcined in an electric furnace at 500° C. for 30 minutes to prepare a porous semiconductor electrode formed of titanium oxide (film thickness: 11 μm). Further, the semiconductor electrode substrate was immersed in a 0.4 mM ethanol solution of ruthenium535bisTBA (Solaronix) for 12 hours, and then washed with ethanol and acetonitrile, whereby a dye was absorbed to the semiconductor electrode (effective area: 0.5 $cm^2$).

Subsequently, an appropriate amount of the electrolyte composition was applied with a spatula to the semiconductor electrode side of the semiconductor electrode substrate, a film having a thickness of 25 μm was placed as a spacer to be sandwiched by the substrates, an opposing substrate (a conductive glass substrate having platinum sputtered thereon) was closely contacted therewith, and the both substrates were joined so that bubbles can not enter and were fixed with a clip, thereby completing a dye-sensitized solar cell.

The photoelectric conversion efficiency was measured by using a 1 kw xenon lamp which was made so as not to emit ultraviolet light of wavelengths of 420 nm or less by use of a UV cut filter, and by effecting light irradiation such that the light quantity at a light receiving surface was 100 mW/$cm^2$. The results are shown in Table 4.

In addition, the cell was left in the state of not encapsulated for one week, and then the photoelectric conversion efficiency was measured. The results are shown in Table 4. After having been left for a week, the cell showed no recognizable leakage of the liquid or electrolyte to the outside, and further showed a conversion efficiency equal to that when encapsulated.

Examples 2 to 5 and Comparative Examples 1 to 3

Dye-sensitized solar cells were prepared following the same procedure as in Example 1 with the exception that the alumina pastes shown in Table 3 were used, and were evaluated similarly as above. The results are shown in Table 4.

In Comparative Example 2, an electrolyte composition using alumina paste 3 was tried to be prepared, but the alumina paste was hardly uniformly mixed and became a massive solid, so that it could not be sandwiched by substrates so as to keep an appropriate gap and the conversion efficiency could not be measured. It was considered that the alumina paste contained too small amount of water relative to hydrated alumina and consequently became lumpy.

In Comparative Example 3, electrolyte compositions were tried to be prepared by mixing alumina paste 4 with other electrolyte liquid components at various ratios, but no pasty electrolyte composition was obtained. It was considered that the alumina paste contained too small amount of hydrated alumina relative to water and consequently the electrolyte composition did not become paste-like.

Example 6

A paste-like electrolyte composition was obtained following the same procedure as in Example 1 with the exception that hydrated alumina having an average particle diameter of 100 nm ("DISPAL23N4-80" (trade name) manufactured by SASOL) was used, and a dye-sensitized solar cell was prepared by use thereof and evaluated. The results are shown in Table 4.

Example 7

A paste-like electrolyte composition was obtained following the same procedure as in Example 1 with the exception that hydrated alumina having an average particle diameter of 300 nm ("DISPAL40" (trade name) manufactured by SASOL), and a dye-sensitized solar cell was prepared by use thereof and evaluated. The results are shown in Table 4.

TABLE 3

| | Electrolyte Mixing Ratio | | | Compositional Ratio of paste Electrolyte | | | |
|---|---|---|---|---|---|---|---|
| | Alumina Paste Species | Addition Amount of Alumina Paste | Electrolyte Liquid 1 | Solid Content of Alumina | Water in Electrolyte | Acetic Acid in Electrolyte | Property |
| Ex. 1 | Alumina Paste 1 | 50.00% | 50.00% | 11.50% | 38.30% | 0.23% | Paste-like |
| Ex. 2 | Alumina Paste 2 | 50.00% | 50.00% | 20.00% | 29.60% | 0.40% | Paste-like |
| Ex. 3 | Alumina Paste 2 | 33.33% | 66.67% | 13.30% | 19.70% | 0.27% | Paste-like |
| Ex. 4 | Alumina Paste 2 | 23.08% | 76.92% | 9.20% | 13.70% | 0.18% | Paste-like |
| Ex. 5 | Alumina Paste 2 | 9.09% | 90.91% | 3.60% | 5.40% | 0.07% | Paste-like |
| Com. ex. 1 | None | | 100.00% | 0.00% | 0.00% | 0.00% | Liquid |
| Com. ex. 2 | Alumina Paste 3 | — | — | — | — | — | Ununiform mixture |
| Com. ex. 3 | Alumina Paste 4 | — | — | — | — | — | Liquid |

It can be seen from these results that when a paste-like electrolyte prepared in a given condition is applied to a semiconductor electrode and is sandwiched between the electrode and a counter electrode, the prepared photoelectric conversion device shows characteristics similar to or better than those of the photoelectric conversion device prepared using a liquid electrolyte. When the addition amount of alumina is 5 wt % or less, the electrolyte composition did not sufficiently become pasty, had the danger of flow out of an electrolyte liquid, and showed almost similar characteristics to those before having become pasty. When the total content of alumina and water reaches 50 wt %, the photoelectric conversion efficiency is lowered. It is considered that the total content of alumina and water is preferably about 30 wt %, and that the solid content of alumina is preferably about 10 wt %.

Incidentally, the electrolyte composition was whitely cloudy and seemed to have inferior transparency to that of the other samples.

Comparative Example 4

When a mixture of 20 wt % of hydrophilic silica having an average diameter of primary particles of about 7 nm (trade name "AEROSIL 300" manufactured by Nippon Aerosil Co., LTD.), 0.4 wt % of acetic acid, and 79.6 wt % of water was stirred with a planetary-type stirrer ("AR100" (trade name) manufactured by Thinky Corp.), the viscosity was very low and a paste similar to alumina paste 1 could not obtained.

Comparative Example 5

When a mixture of 13.9 wt % of hydrophilic silica used in Comparative Example 4, 2.8 wt % of acetic acid, and 83.3 wt % of water was stirred with a planetary-type stirrer ("AR100"

(trade name) manufactured by Thinky Corp.), a paste similar to alumina paste 1 was obtained.

When the paste and an electrolyte liquid (a high-boiling-point solvent liquid electrolyte, which had 0.5 M of lithium iodide and 0.05 M of iodine dissolved in polyethylene glycol of an average molecular weight of 200 as a solvent) were mixed and stirred with a planetary-type stirrer ("AR100" (trade name) manufactured by Thinky Corp.), the electrolytes obtained at any mixing ratio each showed a very low viscosity and did not become such a paste-like form as to have adequate viscosity and no flowability.

Comparative Example 6

The hydrophilic silica in the amount of 12.46 wt % by a solid content, which was used in Comparative Example 4, and the electrolyte liquid in the amount of 87.54 wt %, which was used in Comparative Example 5 were mixed, and the mixture was stirred with a planetary-type stirrer ("AR100" (trade name) manufactured by Thinky Corp.) to give a uniform paste-like electrolyte.

A dye-sensitized solar cell was prepared by use of this electrolyte similarly as in Example 1 and was evaluated similarly. The results are shown in Table 4.

TABLE 4

|  | Conversion Efficiency η [relative value] |
|---|---|
| Example 1 | 1.00 |
| Example 1 (one week after) | 1.00 |
| Example 2 | 1.06 |
| Example 3 | 1.88 |
| Example 4 | 2.00 |
| Example 5 | 1.65 |
| Comparative Example 1 | 1.06 |
| Example 6 | 1.94 |
| Example 7 | 1.06 |
| Comparative Example 6 | 0.81 |

This application claims priority from Japanese Patent Application No. 2004-058673 filed Mar. 3, 2004, which is hereby incorporated by reference herein.

What is claimed is:

1. A dye-sensitized solar cell having an electrolyte layer comprising an electrolyte composition for use in a dye-sensitized solar cell that carries a dye on a semiconductor and converts light energy to electric energy by photoexcitation of the dye, wherein the electrolyte composition comprises hydrated alumina and water, and has a paste-like form, and wherein the electrolyte composition contains 1 to 20 wt % of hydrated alumina and 5 to 30 wt % of water.

2. The dye-sensitized solar cell of claim 1, wherein the hydrated alumina has an average particle diameter of 200 nm or less.

3. The dye-sensitized solar cell of claim 1, wherein the hydrated alumina is a γ-type crystal.

4. A method of producing a dye-sensitized solar cell comprising the steps of:

applying to a semiconductor on an electrode, an electrolyte composition for use in a dye-sensitized solar cell that carries a dye on a semiconductor and converts light energy to electric energy by photoexcitation of the dye, the electrolyte composition comprising hydrated alumina and water and having a paste-like form, thereby forming an electrolyte layer; and providing an opposing electrode on the electrolyte layer, wherein the electrolyte composition contains 1 to 20 wt % of hydrated alumina and 5 to 30 wt % of water.

5. The method of producing a dye-sensitized solar cell of claim 4, wherein the hydrated alumina has an average particle diameter of 200 nm or less.

6. The method of producing a dye-sensitized solar cell of claim 4, wherein the hydrated alumina is a γ-type crystal.

* * * * *